(12) United States Patent
Yamazaki et al.

(10) Patent No.: US 6,612,885 B2
(45) Date of Patent: Sep. 2, 2003

(54) EXHAUST SYSTEM FOR WATERCRAFT

(75) Inventors: Susumu Yamazaki, Shizuoka (JP); Shigeharu Minco, Shizuoka (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 0 days.

(21) Appl. No.: 09/996,520

(22) Filed: Nov. 28, 2001

(65) Prior Publication Data

US 2002/0065007 A1 May 30, 2002

(30) Foreign Application Priority Data

Nov. 29, 2000 (JP) .......................... 2000-362211

(51) Int. Cl.$^7$ .............................................. B63H 21/32
(52) U.S. Cl. .................................. 440/89 C; 440/89 H
(58) Field of Search ............................ 440/88, 89, 88 J, 440/89 R, 89 C, 89 H

(56) References Cited

U.S. PATENT DOCUMENTS

| | | | |
|---|---|---|---|
| 5,396,767 A | | 3/1995 | Suzuki |
| 5,425,232 A | * | 6/1995 | Holtermann ................ 60/272 |
| 5,459,998 A | * | 10/1995 | Hosoya et al. ............... 60/284 |
| 5,702,276 A | * | 12/1997 | Nakase et al. ............... 440/89 |
| 5,809,773 A | * | 9/1998 | Gottberg ...................... 60/274 |
| 5,911,609 A | * | 6/1999 | Fujimoto et al. ............. 440/89 |
| 6,302,752 B1 | | 10/2001 | Ito et al. |
| 6,312,299 B1 | | 11/2001 | Henmi |

OTHER PUBLICATIONS

Existing Application entitled, "*Induction System for 4–Cycle Engine of Small Watercraft*", Application No.: 09/764,949 filed on Jan. 17, 2001.

Existing Application entitled, "*Engine Compartment for Personal Watercraft*", Application No.: 09/280,262 filed on Mar. 29, 1999.

The Motor Vehicle, K. Newton, W. Steeds, T.K. Garrett, Twelfth Edition, SAE International, 1996.

\* cited by examiner

*Primary Examiner*—Stephen Avila
(74) *Attorney, Agent, or Firm*—Knobbe, Martens, Olson & Bear, LLP

(57) ABSTRACT

An internal combustion engine includes an exhaust system. Additionally, the engine includes a secondary air injection system that injects air into the exhaust system to burn un-burnt fuel that may be entrained in the exhaust gases. The secondary air injection system can include individual secondary injection conduits, each having a check valve, and being configured to inject air into each exhaust runner of the engine. The secondary air injection system can also include, in lieu or in addition, a cooling jacket cooling a portion of the exhaust system between upstream from a catalyst device and downstream from the point of injection of secondary air.

43 Claims, 8 Drawing Sheets

EXHAUST SYSTEM FOR WATERCRAFT

PRIORITY INFORMATION

This application is based on and claims priority to Japanese Patent Application No. 2000-362211 filed Nov. 29, 2000, the entire contents of which is hereby expressly incorporated by reference.

BACKGROUND OF THE INVENTION

1. Field of the Invention

The present invention generally relates to an exhaust system for an internal combustion engine. More specifically, the present invention relates to an air injection system for the exhaust system of an internal combustion engine, which can be used in a watercraft.

2. Related Art

In order to control the emission of unwanted exhaust gas constituents, a wide variety of devices have been proposed. Frequently, catalytic converters are employed for treating exhaust gases emanating from internal combustion engines before those gases are discharged to the atmosphere. As is well known, a catalytic converter should be operated at the appropriate temperature in order for it to effectively treat exhaust gases.

For this reason, it has been proposed to place the catalytic converter as close to the exhaust ports of the engine as possible. However, a single catalytic converter is not always sufficient to provide all of the desired exhaust gas treatment. Therefore, it has become common to employ plural catalytic converters in series in an exhaust system.

Where plural catalytic converters are used, the downstream catalytic converter will receive exhaust gases that have been previously treated. A catalytic converter, in effect, causes afterburning of the exhaust gases which provides one way in which unwanted exhaust gas constituents are controlled. However, the downstream catalytic converter may not receive exhaust gases that are adequate to permit further afterburning.

It has also been known to add supplemental air to exhaust systems between the upstream and downstream converters so that the downstream converter can effectively treat the exhaust gases. One way in which this is done is to provide an atmospheric air inlet to the downstream catalytic converter which will introduce air to the converter so as to allow more effective afterburning. For example, in the art of automotive internal combustion engines, it has been known to drive an air pump with a crankshaft so as to draw and pressurize air in the vicinity of the engine and inject the air into the exhaust system in the vicinity of the exhaust ports of the engine and/or at a position between two catalytic converters mounted in series. In one known system, air from an air pump passes through a one-way check valve and then is divided into individual air supply lines for feeding each exhaust port with secondary air. Other known systems include an additional secondary air supply line with a check valve, which feeds secondary air to a point in the exhaust system between two catalytic converters mounted in series.

SUMMARY OF THE INVENTION

One aspect of the present invention includes the realization that prior known secondary air injection systems have suffered from several problems. In particular, as an internal combustion engine operates, air fuel mixture is burned inside the internal combustion chambers. The burnt mixture is then discharged to the atmosphere through the exhaust system. However, because the exhaust gas is forcibly discharged from the combustion chamber, the pressure inside the entire exhaust passage tends to be positive and to fluctuate at a frequency corresponding to the number of combustion chambers within the internal combustion engine as well as the engine's speed. Thus, it has been found that prior known secondary air injection systems do not accurately inject the proper amount of secondary air into the exhaust system.

In accordance with another aspect of the present invention, an engine includes an engine body defining a plurality of combustion chambers. The engine also includes an exhaust system configured to guide exhaust gases from the combustion chambers to the atmosphere. The exhaust system includes a plurality of exhaust runners extending from the engine body and merging into a common passage. A secondary air injection system includes a plurality of secondary air conduits configured to deliver secondary air separately to each individual exhaust runner, and at least one check valve is disposed in each secondary air conduit.

By constructing the engine as such, the check valves attenuate the effect of exhaust gas flow in one exhaust runner on adjacent exhaust runners. Thus, the secondary air injection system of the present engine can more accurately deliver secondary air to the exhaust system, and thereby enhance the cleaning effects of secondary air injection.

In accordance with yet another aspect of the present invention an engine includes an engine body defining at least one combustion chamber. The engine also includes an exhaust system defining an exhaust discharge path extending from the engine body to the atmosphere. A catalyst device is disposed in the exhaust discharge path. A secondary air injection system is configured to inject secondary air into the exhaust discharge path at a position upstream from the catalyst device. Additionally, a cooling jacket is disposed in thermal communication with at least a portion of the exhaust discharge path upstream from the catalyst device and downstream from the position into which secondary air is injected into the exhaust discharge path.

By constructing the engine as such, the cooling jacket helps to cool the exhaust gasses which can be heated by the injection of secondary air. Thus, the present engine helps prevent over-heating of downstream exhaust components such as, for example, but without limitation, the catalyst device.

BRIEF DESCRIPTION OF THE DRAWINGS

These and other features, aspects and advantages of the present invention will now be described with reference to the drawings of preferred embodiments. The embodiments are intended to illustrate and not to limit the invention, and in which figures.

DETAILED DESCRIPTION OF THE PREFERRED EMBODIMENTS OF THE INVENTION

An improved secondary air injection system for a watercraft is disclosed herein. The injection system includes enhanced features for improving the effectiveness of the injection of secondary air into the exhaust system. Thus, the processing of exhaust gases discharged from the watercraft is improved.

Figure 1:
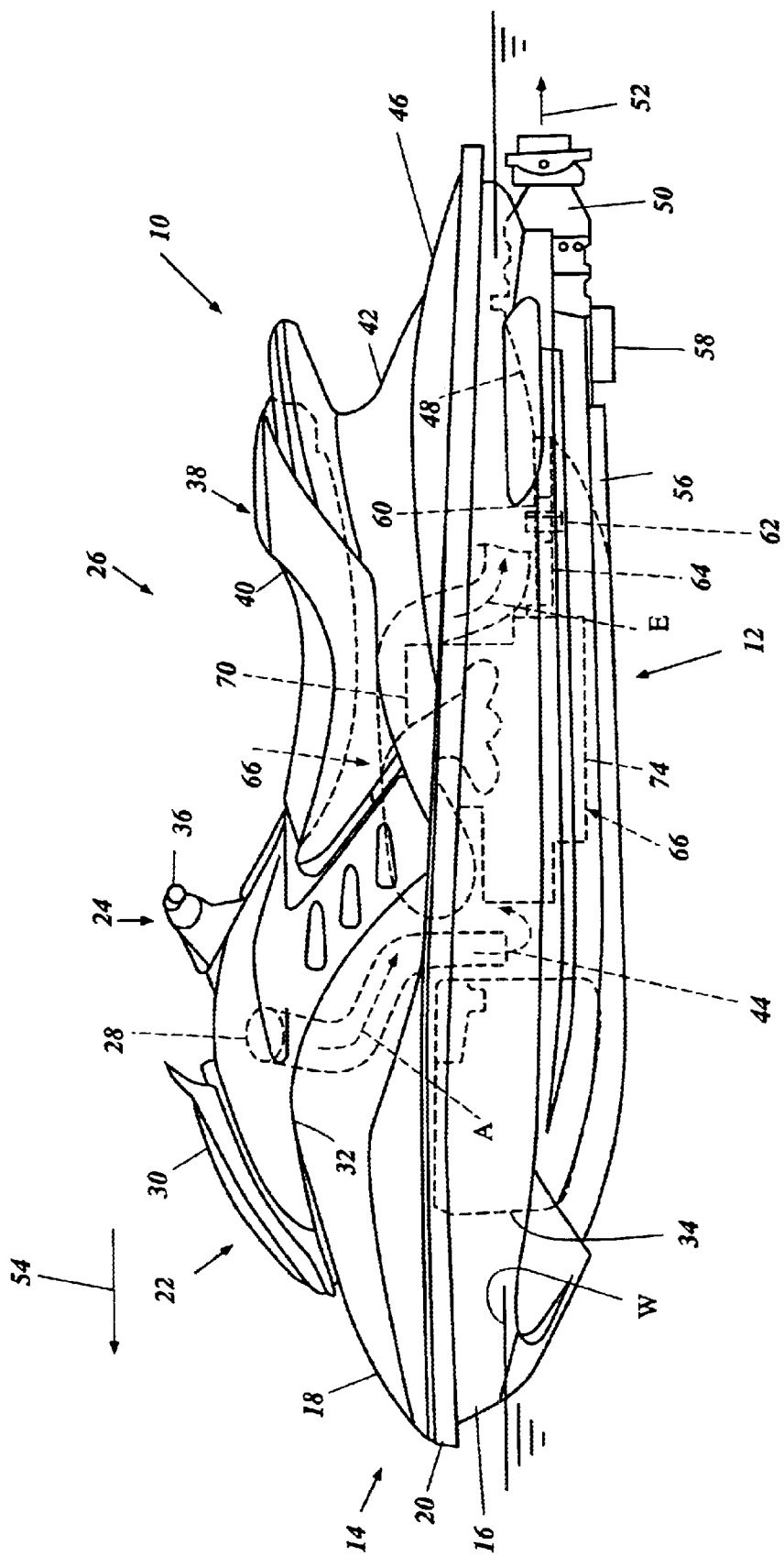
FIG. 1 is a side elevational view of a watercraft constructed in accordance with one embodiment of the present invention, with certain internal components, such as an engine, a fuel tank, a ventilation duct, and a portion of a jet propulsion device illustrated in phantom.

FIG. 1 illustrates a personal watercraft 10 which includes a secondary air injection system 12 configured in accordance with a preferred embodiment of the present invention. Although the present secondary air injection system 12 is illustrated in connection with a personal watercraft 10, the illustrated secondary air injection system 12 can be used with other types of vehicles as well, such as, for example, but without limitation, small jet boats, automobiles, as well as off-road vehicles. Before describing the secondary air injection system 12, an exemplary personal watercraft 10 will first be described in general details to assist the reader's understanding of the environment of use and the operation of the injection system 12.

The watercraft 10 includes a hull 14 formed by a lower hull section 16 and an upper deck section 18. The hull section 16, 18 are formed from a suitable material such as, for example, a molded fiberglass reinforced resin (e.g., SMC). The lower hull section 16 and the upper deck section 18 are affixed to each other around the peripheral edges 20 in any suitable manner.

As viewed in the direction from bow to stern of the watercraft 10, the upper deck section 18 includes a bow portion 22, a control mast 24, and a rider's area 26. The bow portion 22 slopes upwardly toward the control mast 24 and includes at least one air duct 28 through which atmospheric air A can enter the hull 14. A hatch cover 30, and/or a cowling portion 32, desirably extends above an upper end of the air duct 28 to inhibit an influx of water into the hull 14. Air can pass through the duct 28 in both directions.

The hatch cover 30 preferably is attached to the upper deck section 18 via a hinge (not shown). A fuel tank 34 preferably is located within the hull 14 beneath the hatch cover 30. Conventional devices, such as, for example, straps, preferably are used to secure the fuel tank 34 to the lower hull 16.

The control mast 24 extends upward from the bow portion 22 and supports a handlebar assembly 36. The handlebar 36 controls the steering of the watercraft 10 in a conventional manner. The handlebar assembly 36 also carries a variety of controls of the watercraft 10, such as, for example, a throttle control, a start switch, and a lanyard switch.

A display panel (not shown) is desirably located in front of the control mast 24 on the bow portion 22 and is oriented to be visible by the rider. The display panel desirably displays a number of performance characteristics of the watercraft such as, for example, watercraft speed, engine speed, fuel level, oil level, engine temperature, battery charge level, and the like.

The rider's area 26 lies behind the control mast 24 and includes a seat assembly 38. In the illustrated embodiment, the seat assembly 38 has a longitudinally extending straddle-type shape which allows an operator and at least one to three passengers to straddle the seat assembly 38.

The seat assembly 38, at least in principle part, is formed by a seat cushion 40 supported by a raised pedestal 42. The raised pedestal 42 has an elongated shape and extends longitudinally along the center of the watercraft 10. The seat cushion 40 desirably is removably attached to a top surface of the pedestal 42 and covers the entire upper end of the pedestal 42 for rider and passenger comfort.

An access opening (not shown) preferably is located on an upper surface of the pedestal 42. The access opening opens into an engine compartment 44 formed within the hull 14. The seat cushion 40 normally covers and seals the access opening. When the seat cushion 40 is removed, the engine compartment 44 is accessible through the access opening.

The pedestal 42 also desirably includes at least one air duct (not shown) located behind the access opening. The air duct communicates with the atmosphere through a space formed between the pedestal 42 and the cushion 40, which is formed behind the access opening. Air can pass through the rear duct in both directions.

The upper deck section 18 preferably includes a pair of raised gunnels 46 positioned on opposite sides of the aft end of the upper deck 18. The raised gunnels 46 define a pair of foot areas (not shown) that extend generally longitudinally and parallel to the sides of the pedestal 42. In this position, the operator and any passenger sitting on the seat assembly 38 can place their feet in the foot areas with the raised gunnels 46 shielding the feet and a portion of the lower legs of the riders. A non-slip (e.g., rubber) mat desirably covers the foot areas to provide increased grip and traction for the operator and the passengers.

The lower hull portion 16 principally defines the engine compartment 44. Except for the air ducts, the engine compartment 44 is normally substantially sealed so as to enclose the engine (described in detail below) of the watercraft 10 from the body of water in which the watercraft is operated.

The lower hull 16 is designed such that the watercraft 10 planes or rides on a minimum surface area at the aft end of the lower hull 16 in order to optimize the speed and handling of the watercraft 10 when up on plane. For this purpose, the lower hull section 16 generally has a V-shaped configuration formed by a pair of inclined sections that extend outwardly from a keel line of the hull 14 to the hull's side walls at a dead rise angle. Each inclined section desirably includes at least one strake, and the strakes of the hull 14 preferably are symmetrically disposed relative to the keel line of the watercraft 10. The inclined sections also extend longitudinally from the bow 22 toward the transom of the lower hull 16. The side walls are generally flat and straight near the stem of the lower hull 16 and smoothly blend toward the longitudinal center of the watercraft 10 at the bow 22. The lines of intersection between the inclined sections and the corresponding side walls form outer chines of the lower hull section 16.

Toward the transom of the watercraft 10, the inclined sections of the lower hull 16 extend outwardly from a recessed channel or tunnel 48 that extends upwardly toward the upper deck portion 18. As used hereinafter, "recessed channel," "tunnel," and "hull tunnel" are used interchangeably to refer to the portion of the transom of the lower hull 16 that is formed to accommodate a jet of water generated by the watercraft for propulsion purposes. For example, the watercraft 10 includes a jet pump 50 which generates a generally rearward directed jet of water 52 to generate a propulsion force to cause forward movement of the watercraft 10, the forward direction being indicated by the arrow 54. Preferably, the watercraft 10 also includes a reverse thrust device, commonly referred to as a "reverse bucket" (not shown). Also preferably, the hull 14 is configured such that the watercraft 10, when at rest, floats at a depth defined by a waterline W sufficient to submerge the jet pump 50.

The jet pump unit 50 is mounted within the tunnel 48 by a plurality of bolts. An intake duct, defined by a portion of the tunnel 48, defines an inlet opening 56 that opens into a gullet. The gullet leads to an impeller housing assembly in which the impeller of the jet pump 50 operates. The impeller housing assembly also acts as a pressurization chamber and delivers the water flow from the impeller housing to a discharge nozzle housing.

A steering nozzle is supported at the downstream end of the discharge nozzle by a pair of vertically extending pivot pins. In the exemplary embodiment, the steering nozzle has an integrated lever on one side that is coupled to the handlebar assembly 36 by, for example, a bowden wire actuator, as known in the art. In this manner, the operator of the watercraft 10 can move the steering nozzle to effect directional changes of the watercraft 10.

A ride plate 58 preferably covers a portion of the tunnel 48 behind the inlet opening 56 to enclose the pump assembly 50 and a nozzle assembly of the propulsion unit. The impeller within the jet pump 50 is connected to an impeller shaft 60 which extends forwardly through the tunnel 48 into the engine compartment 44. As used hereinafter, the term "impeller shaft," refers to either a single shaft which drives the impeller and is rotatably journaled within the jet pump 50, or a combination of shafts which perform the functions of driving and journalling the impeller.

At its forward end, the impeller shaft 60 is connected to a coupling 62. The coupling connects the impeller shaft 60 to an intermediate drive shaft 64. Optionally, the coupling 62 can connect the impeller shaft 60 directly to a crankshaft of an engine within the engine compartment 44, described below in greater detail.

An internal combustion engine 66 of the watercraft 10 powers the impeller shaft 60 to drive the impeller within the jet pump 50. The engine 66 is positioned within the engine compartment 44 and is mounted primarily beneath the rider's area 26. Vibration absorbing engine mounts (not shown) are preferably shown to secure the engine 66 to the lower hull portion 16 in a known manner. The engine 66 is mounted approximately in a central position of the watercraft 10.

In the illustrated embodiment, the engine 66 includes three in-line cylinders and operates on a two-stroke, crankcase compression principle. The engine 66 is positioned such that the row of cylinders is vertical and lies parallel to a longitudinal axis of the watercraft, running from bow to stern. However, the axis of each cylinder may be skewed or inclined relative to a vertical central plane of the watercraft 10, in which the longitudinal axis lies. This engine type, however, is merely exemplary. Those skilled in the art will readily appreciate that the present secondary air injection system, exhaust system, and induction system can be used with any variety of engine types having other numbers of cylinders, and having other cylinder arrangements.

Figure 2:
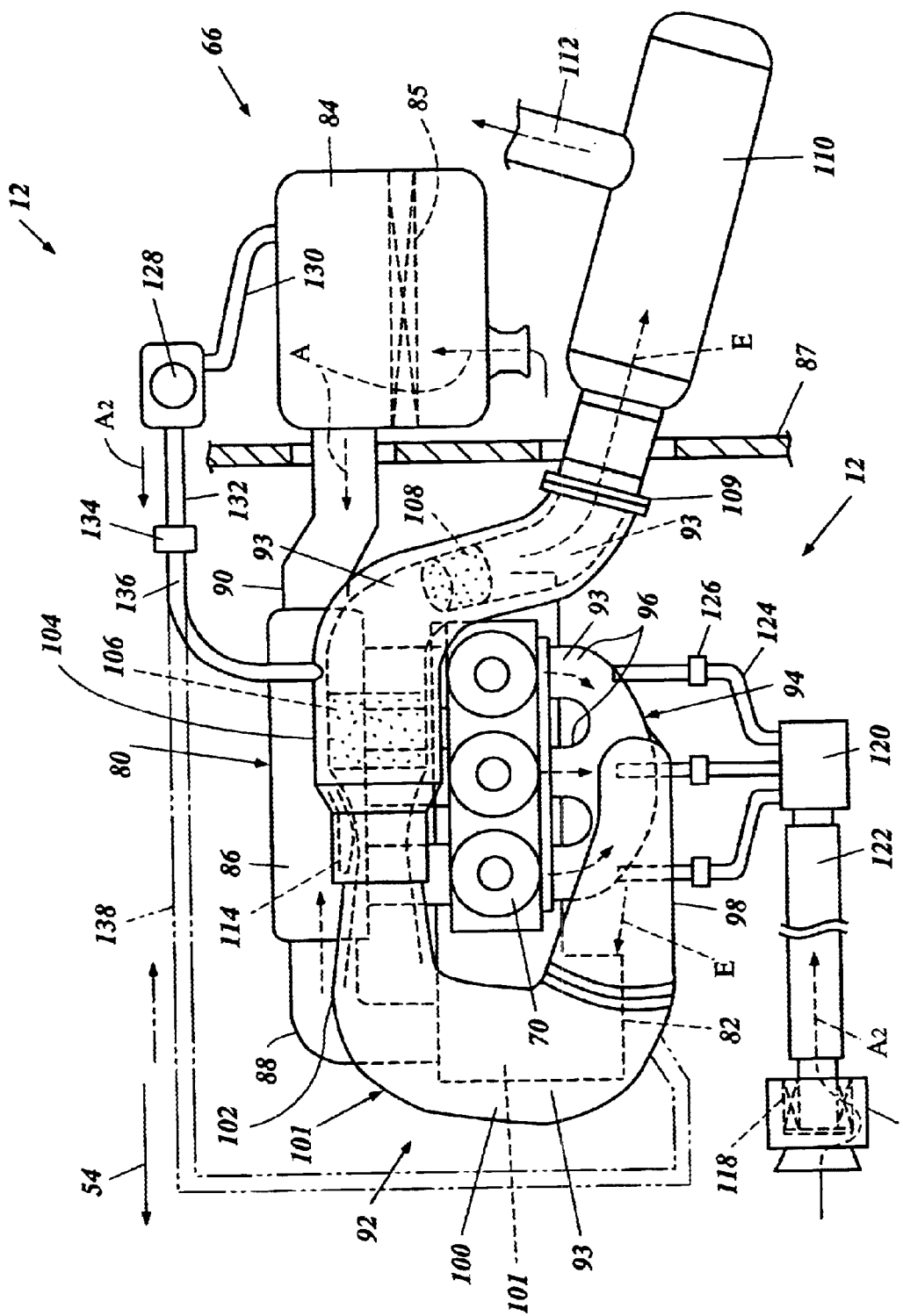
FIG. 2 is a top plan and schematic view of the engine shown in FIG. 1, illustrating several components of the exhaust, induction, and secondary air injection systems thereof.
Figure 3:
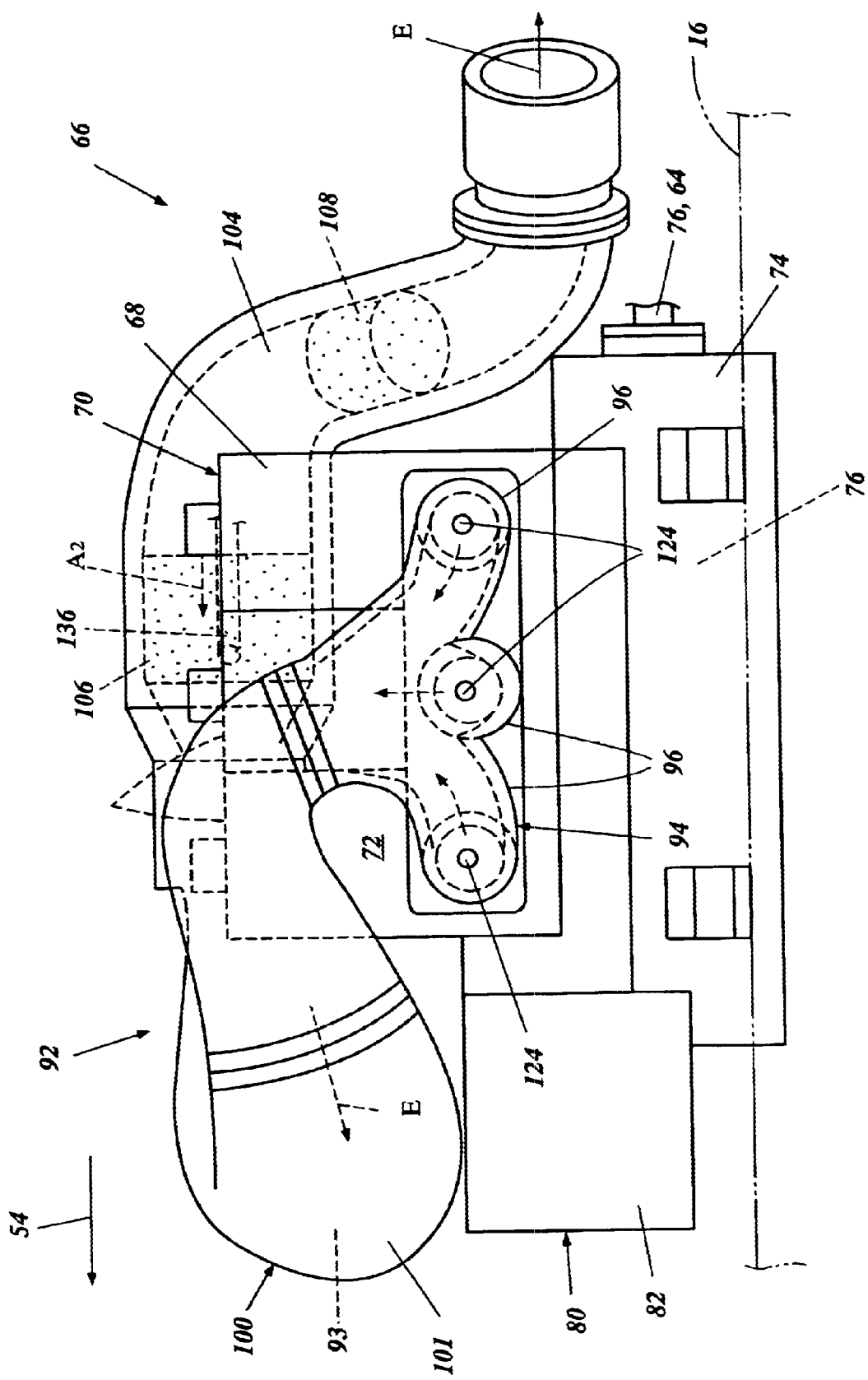
FIG. 3 is a port side elevational view of the engine shown in FIG. 2.

With reference to FIGS. 2 and 3, the engine 66 includes an engine body 68 having a cylinder head 70 at its upper end, a cylinder block 72 disposed beneath the cylinder head 70, and a crankcase 74 disposed beneath the cylinder block 72. In the illustrated embodiment, the engine 66 includes three cylinder bores within the cylinder block 72. Pistons (not shown) reciprocate within each of the cylinder bores 72 and are each connected to a crankshaft 76 disposed within the crankcase 74. Together, the pistons, cylinder bores, and cylinder head 70 define three combustion chambers within the engine body 68. The engine 66 can be configured such that the crankshaft 76 extends through an end wall of the crankcase 74 and connects to the coupling 62. Optionally, the crankshaft 76 can be connected to the intermediate drive shaft 64 in a known manner.

With reference to FIG. 2, the watercraft 10 includes an air induction system 80 for guiding air into the combustion chambers. The air induction system 80 includes a first plenum chamber 82 disposed on a forward end of the engine body 68. Additionally, the watercraft includes a second plenum chamber 84 disposed rearwardly from a bulkhead 87 disposed within the engine compartment 44. The air induction system 80 also includes a third intake chamber 86.

The first intake air chamber 82 is connected to the third intake air chamber 86 with a first intake air pipe 88 which extends laterally from the first intake air chamber 82 and then curves rearwardly and connects with a forward wall of the third intake air chamber 86. The second intake air chamber is connected to the third intake air chamber via a second intake air pipe 90. The second intake air pipe 90 extends forwardly from the second intake air chamber 84, through the bulkhead 87, and connects to a rear wall of the third intake air chamber 86.

The second intake air chamber preferably includes a water repellant filter element 85. Thus, atmosphere air A entering the second intake air chamber 84 passes through the water repellant filter element 85 before passing into the second intake air pipe 90. Thus, liquid or vaporized water that may be mixed with the atmospheric air A entering the second intake air chamber 84 can be separated therefrom. It should be noted, that the first intake air chamber 82 can be constructed in accordance with the description set forth herein with respect to the second intake air chamber 84.

Figure 4:
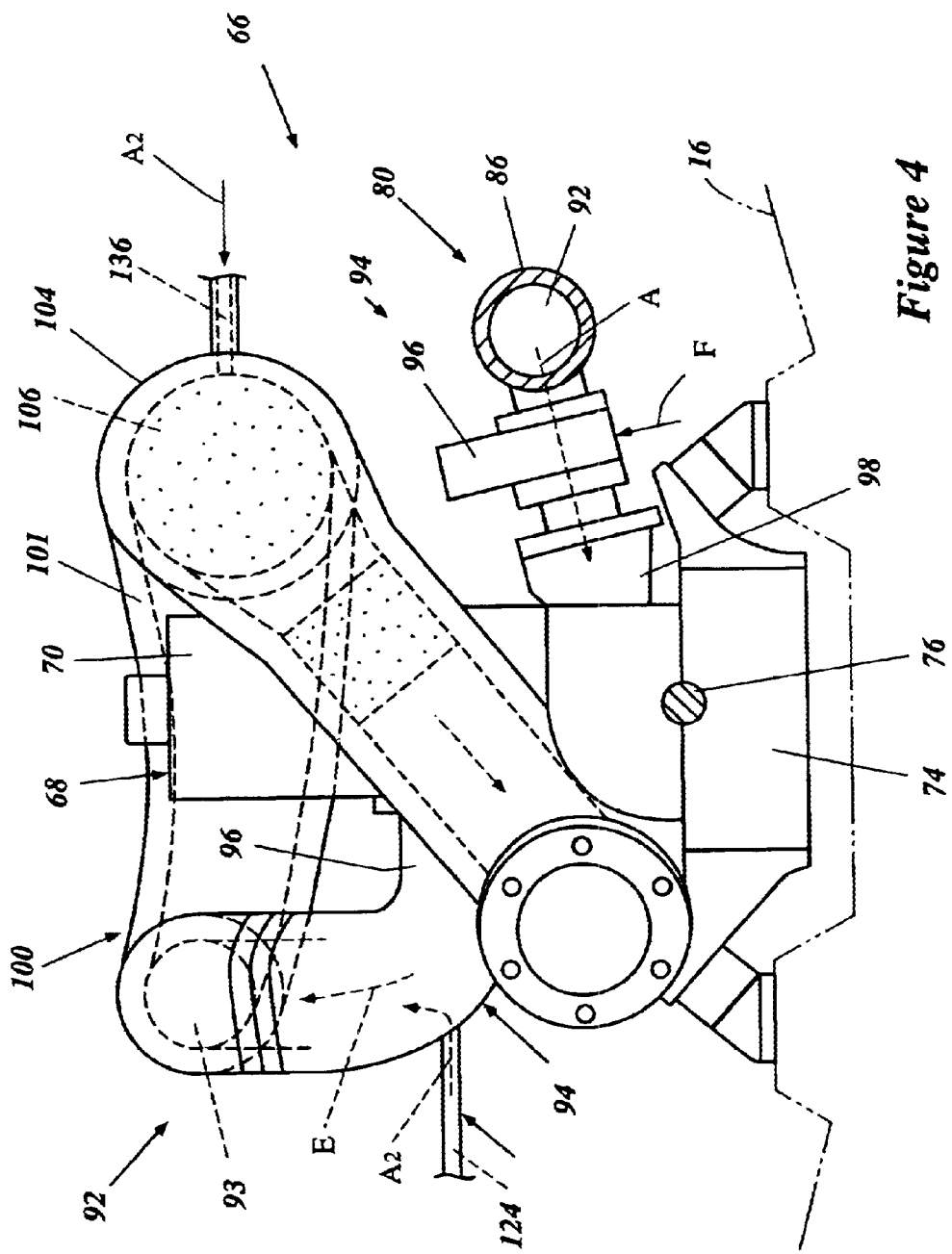
FIG. 4 is a rear elevational view of the engine shown in FIG. 2.

With reference to FIG. 4, the third intake air chamber 86 is in the form of a pipe defining an interior volume 92. The interior volume 92 is connected to the crankcase 74 through a throttle device 94. In the present embodiment, the throttle device 94 is a carburetor 96. However, the throttle device 94 could also be in the form of a throttle body and fuel injector combination. Optionally, the fuel injector can be connected to the throttle body, connected to a scavenge passage within the engine body 68 or mounted so as to spray fuel directly into the combustion chamber.

The throttle device 94 is connected to the crankcase 74 through a reed valve assembly 98. As such, atmospheric air can flow into the first and second intake air chambers 82, 84, flow through the first and second intake air pipes 88, 90, and into the third intake air chamber 86. From the internal volume 92 of the third intake air chamber 86, atmospheric air A can flow through the throttle device 94, the reed valve 98, and into the crankcase 74.

The watercraft 10 also includes a fuel delivery system (not shown) for delivering fuel to the carburetor 96. Optionally, in other configurations, the fuel delivery system delivers fuel to at least one fuel injector. In the illustrated embodiment, the fuel delivery system delivers fuel F to the carburetor. In operation, the carburetor 96 mixes the fuel F with atmospheric air A before it enters the crankcase 74. From the crankcase, the fuel air mixture formed by the carburetor 96, is delivered to the combustion chambers and combusted therein.

The watercraft 10 also includes an exhaust system 92 which defines an exhaust gas discharge path 93 configured to guide exhaust gases E from the engine to the atmosphere. The exhaust system 92 includes an exhaust manifold 94. The upstream end of the exhaust manifold defines individual exhaust runners 96 which communicate with exhaust ports formed on the side of the cylinder block 70. At its downstream end, the exhaust manifold 94 merges into a common exhaust passageway. The common exhaust passageway extends from the downstream end of the exhaust manifold 94 to the atmosphere and can be formed of a number of exhaust pipes and other exhaust components.

In the illustrated embodiment, the common exhaust passageway is defined by a first exhaust pipe 98 connected to the exhaust manifold 94 at its upstream end. The first exhaust pipe 98 has a diverging conical shape and is connected to a second exhaust pipe 100 at its downstream end. At its downstream end, the second exhaust pipe 100 includes a conical converging portion 102. As such, the first exhaust pipe 98 and the second exhaust pipe 100 form an expansion chamber 101, which can have a shape commonly used for such expansion chambers on two-stroke engines.

At its downstream end, the second exhaust pipe 100 is connected to a second expansion chamber 104 which houses a first catalyst device 106. The catalyst device 106 includes a catalyst bed for treating exhaust gases. In particular, the catalyst bed is configured to burn excess hydrocarbons flowing with the exhaust gases E through the exhaust system.

At its downstream end, the second expansion chamber 104 includes a second catalyst device 108 which is also configured to treat exhaust gases. Further downstream from the second catalyst device 108 is a coupling 109 which connects the second expansion chamber 104 with a water trap device 110. The water trap device includes an outlet 112 which is coupled, either directly or with a plurality of additional exhaust pipes and/or silencing devices, to an outer surface of the hull 14 to discharge exhaust gases to the atmosphere.

In operation, exhaust gases E are discharged from the exhaust ports of the engine 66 into the exhaust runners 96. The exhaust gases then merge together and flow out of the downstream end of the exhaust manifold 94 into the expansion chamber 101 defined by the first and second exhaust pipes 98, 100. The exhaust gases then flow through the catalyst devices 106, 108, and into the water trap device 110. The water trap device 110 can include one or a plurality of additional expansion chambers. Additionally, the water trap device 110 is configured to prevent water from flowing upstream through the exhaust system toward the engine 66. From the water trap device 110, exhaust gases are discharged through the outlet 112 and eventually to the atmosphere.

Preferably, the jet pump 50 supplies cooling water through a conduit (not shown) to an engine cooling jacket. For this purpose, an outlet port may be formed on the housing of the jet pump 50. The conduit is coupled to an outlet port and extends to an inlet port for supplying coolant, such as water, to the engine cooling jacket. The engine cooling jacket can extend through the exhaust manifold, the cylinder block, about the cylinders, and through the cylinder head assembly. The cylinder head assembly and/or the exhaust manifold 96 can include a coolant discharge port through which cooling water exits the engine 66 and then flows through at least a portion of the exhaust system 92. Preferably, the first and second exhaust pipes 98, 100, include a coolant jacket around the exhaust gas discharge path. Also preferably, the second expansion chamber 104 includes a coolant jacket disposed around the first and second catalyst devices 106, 108. The coolant jacket around the first and second exhaust pipes 98, 100 is connected to the coolant jacket around the second expansion chamber 104 through a concentric connector device 114.

The secondary air injection system 12 includes a secondary air intake box 116 disposed within the engine compartment 44. Although the air flow through the secondary air intake box 116 is relatively small, the air intake box 116 preferably includes an air filter 118 for removing foreign particles from air flowing therein.

The secondary air injection system 12 also includes a secondary plenum chamber 120. The plenum chamber 120 is connected to the intake 116 through a secondary air pipe 122. The secondary plenum 120 is connected to each of the exhaust runners 96 through individual secondary air supply lines 124. Each of the secondary air supply lines 124 includes a one-way check valve 126.

Figure 5:
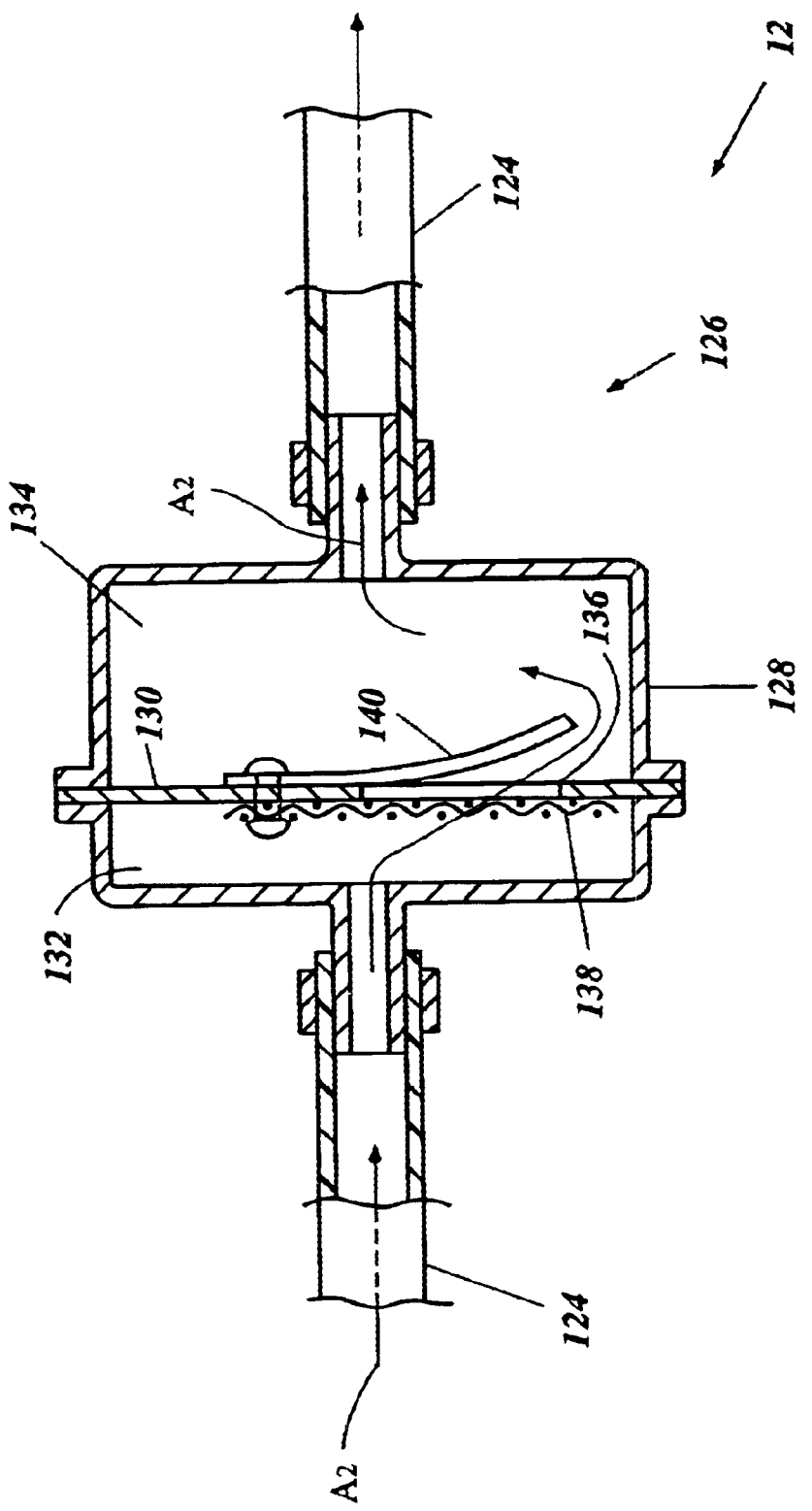
FIG. 5 is a partial sectional view of a check valve included in the secondary air injection system shown in FIG. 2.

With reference to FIG. 5, the check valves 126 include a valve case 128 supporting an interior wall 130 which divides an interior volume of the case 128 into an inlet side 132 and an outlet side 134. The interior wall 130 includes an aperture 136. A metallic screen 138 is disposed over the aperture 136. Additionally, a reed valve member 140 is disposed over the aperture 136, on the outlet side 134, to form a reed valve with the aperture 136. Thus, the secondary atmospheric air $A_2$ flowing into the valve body 128 through the inlet side 132 can flow past the reed valve member 140 and into the outlet side 134. However, the reed valve 140 is configured to prevent the back flow of air or gas from the outlet side 134 to the inlet side 132.

During operation, secondary atmospheric air $A_2$ flows into the secondary air intake chamber 116, through the secondary air pipe 122, and into the secondary air plenum 120. When the air pressure in the respective exhaust runners 96 is below atmospheric, secondary atmospheric air $A_2$ is drawn through the corresponding secondary air supply pipe 124, through the check valve 126, and into the exhaust runner 96. As such, the flow of secondary air $A_2$ to the individual secondary air supply pipes 124 is less affected by the pressures within adjacent exhaust runners 96, since each individual secondary air supply pipe 124 includes a check valve 126. Thus, the present secondary air injection system 12 can more accurately deliver an amount of secondary air $A_2$ to a particular exhaust runner 96, and thus more predictably provide air for combusting unburnt hydrocarbons in the exhaust gas E.

Alternatively, or in addition to the components described above, the secondary air injection system 12 can be configured to draw air from the second intake air chamber 84 and inject it into the exhaust system 92. In the illustrated embodiment, the secondary air injection system 12 includes an air pump 128 which draws air from within the second air intake chamber 84 on the downstream side of the water repellant element 85 through a secondary air inlet pipe 130. The air pump 128 can be, for example, but without limitation, a vein-type or a trochoid-type air pump.

At its downstream end, the air pump 128 is connected to a secondary air discharge pipe 132. Accordingly, at its downstream end, the secondary air discharge pipe 132 is connected to a check valve 134. The check valve 134 can be constructed in accordance with the description of the check valve 126 set forth above.

At its downstream end, the check valve 134 is connected to a secondary air injection pipe 136 which directs secondary air into the exhaust pipe forming the expansion chamber 104 downstream from the catalyst device 106.

In operation, the air pump 128 draws air from the second intake air chamber 84 and injects it into the exhaust gases E downstream from the catalyst device 106. Thus, water is prevented from entering the air pump 128. Additionally, the secondary air does not provide excess air to the catalyst device 106, which could cause overheating of the catalyst device 106 and thereby shorten its lifespan.

Alternatively, or in addition to the injection pipe 136, the secondary air injection system can include a secondary air injection pipe 138 which discharges pressurized secondary air from the air pump 128 into an upstream end of the expansion chamber 101 defined by the exhaust pipes 98 and 100.

As noted above, one aspect of the present invention includes the realization that a cooling jacket around an exhaust pipe can provide sufficient cooling of the exhaust gases so as to prevent overheating of downstream catalyst devices when secondary air is injected therein. Thus, although secondary air is injected into an upstream portion of the expansion chamber 101, the cooling jacket around the expansion chamber 101 cools the exhaust gases E such that overheating of the downstream catalyst devices 106, 108 is less likely.

Figure 6:
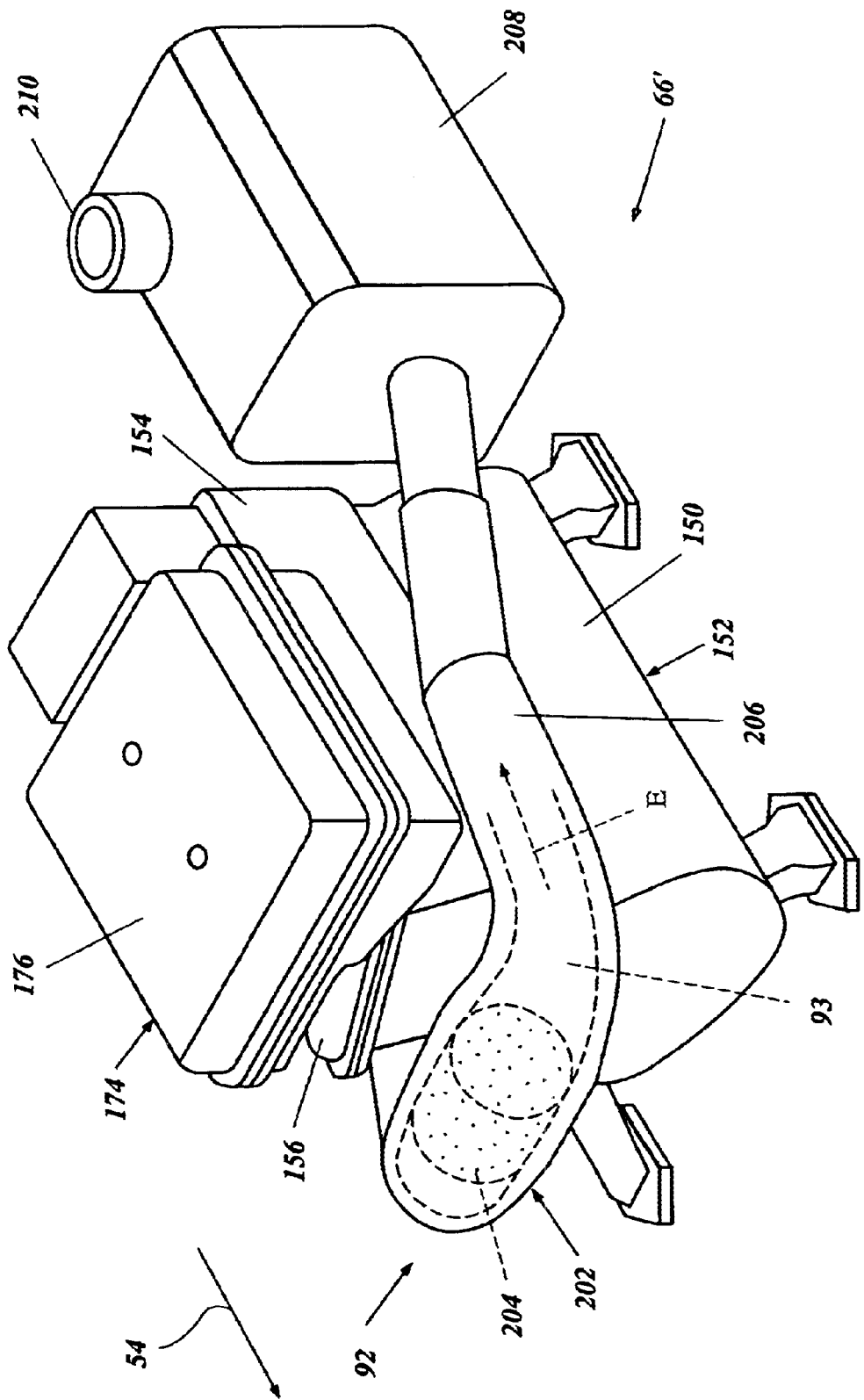
FIG. 6 is a front, port, and top side perspective view of a modification of the engine shown in FIG. 2.

With reference to FIG. 6, a modification of the engine 66 shown in FIGS. 2–4, is shown therein and referred to generally by the reference numeral 66'. As shown in FIG. 6, the engine 66' includes an engine body 150 having a crankcase 152 at its lower end. A cylinder block 154 is connected to an upper side of the crankcase 152. A cylinder head assembly 156 is connected to an upper side of the cylinder block 154.

Figure 7:
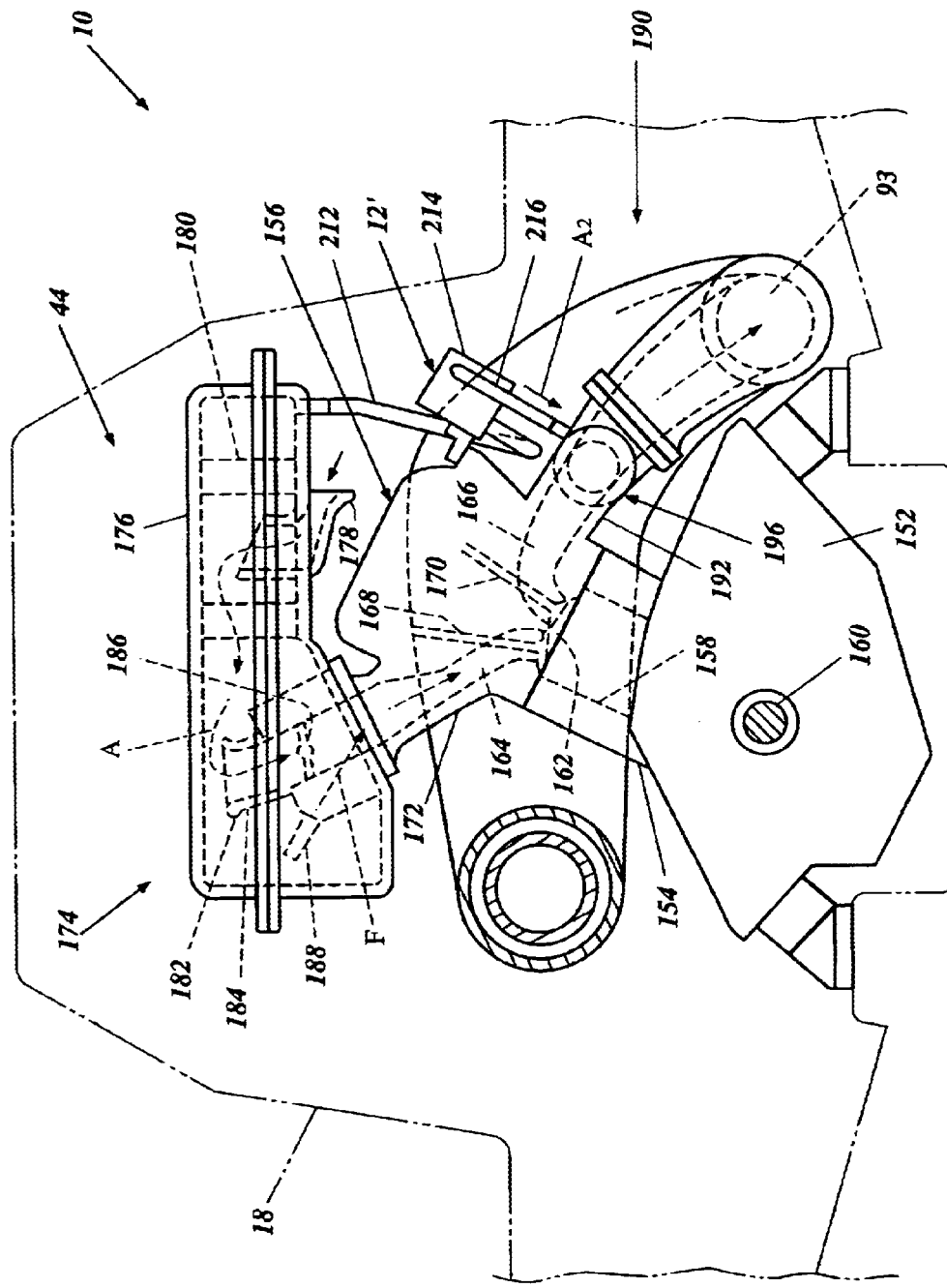
FIG. 7 is a partial sectional and rear elevational view of the engine shown in FIG. 6.

With reference to FIG. 7, the cylinder block 154 includes four cylinder bores 158. Pistons (not shown) reciprocate within the cylinder bores 158. The pistons are rotatably connected to a crankshaft 160 in a manner known in the art. Cylinder bores 158, pistons, and the cylinder head assembly 156 cooperate to form combustion chambers 162.

The cylinder head assembly 156 includes induction passages 164 and exhaust passages 166. The inner ends of the intake and exhaust passages 164, 166 terminate at valve seats at the combustion chambers 162. Intake valves 168 control the flow of air into the combustion chambers 162. Similarly, exhaust valves 170 control the flow of exhaust gases out of the combustion chambers 162. The valves 168, 170 preferably are driven by an overhead cam arrangement, as known in the art.

In the illustrated embodiment, intake runners 172 extend outwardly from the cylinder head assembly 156 and connect with the intake passages 164. The intake runners 172, at their upstream ends, are connected to an induction system 174. The induction system 174 includes an air box 176 formed of upper and lower members sealed together. At its upstream end, the air box 176 includes an inlet 178 which opens to the engine compartment 44. The inlet 178, at its downstream end, opens to an interior of the air box 176. An air cleaner element 180 surrounds the downstream end of the inlets 178.

Also disposed within the air box 176 is at least one throttle device 182. In the illustrated embodiment, the throttle device 182 includes a throttle body 184 in which a throttle valve 186 is rotatably mounted. A fuel injector 188 is mounted to the throttle body 184. A fuel system (not shown) supplies fuel to the fuel injector.

In the illustrated embodiment, there is one throttle device 182 for each combustion chamber 162. Optionally, the throttle devices 182 can be in the form of carburetors. Furthermore, the throttle devices can be constructed with only the throttle body 184. In this mode, a fuel injector can be mounted directly in the cylinder head assembly 156 so as to inject fuel directly into the combustion chambers 162.

In operation, atmospheric air A flows into the air box 176 through the inlet 178. As the air exits the inlet 178, it is directed into an interior space defined within the air filter 180. To reach the throttle device 182, the air A passes through the filter device 180, thereby filtering out foreign substances. Under the control of the throttle valve 186, atmospheric air A travels into the throttle device 182, past the throttle valve 186, and is mixed with fuel F injected by the fuel injector 188, thereby forming an air-fuel charge. Flow of the air fuel charges into the combustion chambers 162 is controlled by the intake valves 168.

After the air fuel charges are combusted in the combustion chambers 162, the exhaust gases flow out of the combustion chambers, through the exhaust passages 166, under the control of exhaust valves 170, in a known manner.

The engine 66' also includes an exhaust system 190. The exhaust system 190 includes a plurality of exhaust runners 192 extending from and connected to the exhaust passages 166.

Figure 8:
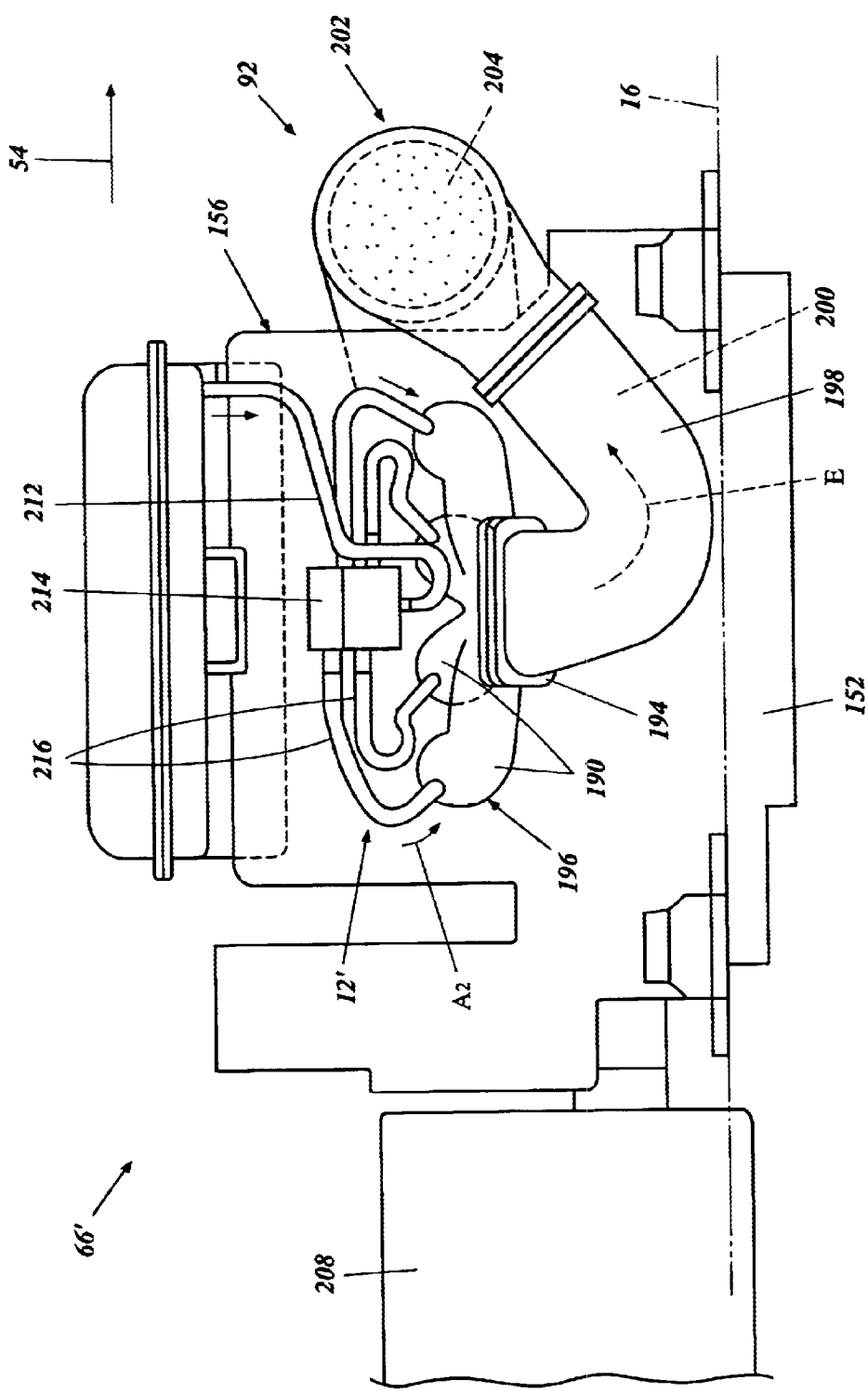
FIG. 8 is a starboard side elevational view of the engine shown in FIG. 6.

As shown in FIG. 8, each of the exhaust runners 190 extend from the cylinder head assembly 156 at their upstream end, to a common passage 194 at their downstream end. Together, the exhaust runners 190 form an exhaust manifold 196. The downstream end 194 of the exhaust manifold 196 is connected to a first exhaust pipe 198 which forms a common exhaust passage 200. At its downstream end, the exhaust pipe 198 is connected to a second exhaust pipe 202 which houses a catalyst device 204.

With reference to FIG. 6, the second exhaust pipe 202 extends around the forward end of the engine 66' and then extends rearwardly to a third exhaust pipe portion 206 and then to a water trap device 208. The water trap device 208, similarly to the water trap device 110, can include one or a plurality of expansion chambers. Preferably, the water trap device 208 includes an arrangement of baffles which prevents water from flowing upstream to the exhaust system. The water trap device 208 includes an outlet 210 which can be connected directly, or by a plurality of additional exhaust pipes (not shown) to an exhaust discharge on an outer surface of the hull 14.

The engine 66', similarly to the engine 66, includes a cooling system. The cooling system includes a number of cooling jackets around the engine body components, as well as the exhaust system components. In particular, the exhaust system 190 includes cooling jackets around the exhaust manifold 196, as well as the exhaust pipes 198, 202, and 206. FIG. 7 illustrates a cooling jacket 203 disposed in thermal communication with the exhaust pipe 206.

Additionally, the engine 66' includes a secondary air injection system 12'. The air injection system 12' includes a secondary air supply pipe 212 which is connected to the interior volume within the air box 176 on the downstream side of the air filter 180. At its downstream end, the secondary air supply pipe 212 is connected to a secondary air collector 214. The secondary air injection system 12' also includes individual secondary air supply pipes 216, each connected to a corresponding intake runner 190.

In operation, air is drawn from air within the air box 176 on the downstream side of the air filter 180, through the secondary air supply pipe 212 into the collector 214. From the collector, the secondary air is drawn through the individual secondary air supply pipes 216 into the individual exhaust runners 190 under the force of the negative pressure created in each of the exhaust runners 190 during operation of the engine 66'.

As noted above, with respect to engine 66, because the common exhaust pipe 198 includes a cooling jacket, the exhaust gases E flowing through the pipe 198 can be cooled sufficiently such that secondary air injected into the exhaust runners does not cause overheating of the catalyst device 204. Thus, the secondary air injection system 12' can inject more secondary air than with the prior art designs, and thereby more completely combust unburnt hydrocarbons in the exhaust gases E. Additionally, the same components of the air injection system 12 can be applied to the engine 66'.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A watercraft comprising a hull defining an engine compartment, an internal combustion engine disposed in the engine compartment, the engine including an engine body defining a plurality of combustion chambers, an exhaust system configured to guide exhaust gases from the combustion chambers to the atmosphere, the exhaust system comprising a plurality of exhaust runners extending from the engine body and merging into a common passage, a secondary air injection system comprising a plurality of secondary air conduits configured to deliver secondary air separately to each individual exhaust runner, and at least one check valve in each secondary air conduit.

2. The watercraft according to claim 1, wherein the check valve comprises a reed valve.

3. The watercraft according to claim 1, wherein the check valves are disposed in close proximity to the exhaust runners.

4. The watercraft according to claim 1 additionally comprising an induction system configured to guide air into the combustion chambers, the secondary air injection system being separate from the induction system.

5. The watercraft according to claim 1, wherein the secondary air injection system further comprises and air inlet chamber, an air collecting chamber, and a conduit connecting the inlet chamber with the air collecting chamber.

6. The watercraft according to claim 5, wherein each of the secondary air conduits includes an upstream end connected to the air collecting chamber.

7. The watercraft according to claim 6, wherein each of the check valves are disposed downstream from the air collecting chamber.

8. The watercraft according to claim 1 additionally comprising an induction system configured to guide air into the combustion chambers, an air pump configured to draw air from the induction system and inject the air into the exhaust system downstream from the exhaust runners.

9. The watercraft according to claim 8, wherein the induction system comprises at least one air intake chamber having a water repellent filter member, the air pump being configured to draw air from the air intake chamber on a downstream side of the water repellent filter member.

10. The watercraft according to claim 8, wherein the air pump is configured to deliver air to the exhaust system on an upstream side of an expansion chamber, the expansion chamber being further upstream than all other expansion chambers and the exhaust system.

11. The watercraft according to claim 8, wherein the air pump is configured to deliver air to the exhaust system at an upstream position of the common passage.

12. The watercraft according to claim 11 additionally comprising a cooling jacket disposed around at least a portion of the common passage downstream from the position to which the air pump delivers air to the exhaust system.

13. The watercraft according to claim 1 additionally comprising an air induction system configured to guide air to the combustion chambers and a bulkhead disposed rearward from the engine, the air induction system including an air intake chamber disposed rearward from the bulkhead.

14. The watercraft according to claim 1, wherein the engine is configured to operate under a four-stroke principle.

15. The watercraft comprising a hull defining an engine compartment, an engine disposed within the engine compartment, the engine including an engine body defining at least one combustion chamber, an exhaust system defining an exhaust discharge path extending from the combustion chamber to the atmosphere, a catalyst device disposed in the exhaust discharge path, a cooling jacket in thermal communication with at least a portion of the exhaust discharge path upstream from the catalyst device, a secondary air injection system configured to inject secondary air into the exhaust discharge path at a position upstream from the catalyst device, and air induction system configured to guide air to the combustion chamber, the secondary air injection system being configured to draw air from the induction system.

16. The watercraft according to claim 15, wherein the engine body defines a plurality of combustion chambers, the exhaust system including a plurality of exhaust runners, each exhaust runner communicating with one combustion chamber, the exhaust system further comprising a common exhaust discharge path receiving gases from all of the exhaust runners, the position at which the secondary air injection system injects air into the exhaust discharge path being in the common exhaust discharge path.

17. The watercraft according to claim 15, wherein a portion of the exhaust discharge path upstream from the catalyst device includes an expansion chamber, the position at which the secondary air injection system injects secondary air into the exhaust discharge path being at an upstream and of the expansion chamber.

18. The watercraft according to claim 17, wherein the expansion chamber includes a cooling jacket.

19. The watercraft according to claim 15, wherein the secondary air injection system includes and air pump, the air pump pressurizing the air injected into the exhaust discharge path.

20. The watercraft according to claim 15, wherein the induction system includes an air intake chamber having a water repellent filter member configured to filter air entering the intake chamber, the secondary air injection system being configured to draw the air from a downstream side of the water repellent filter member.

21. The watercraft according to claim 15, wherein the engine is configured to operate under a four-stroke principle.

22. The watercraft according to claim 15, wherein the engine is configured to operate under a two-stroke principle.

23. An engine comprising an engine body defining a plurality of combustion chambers, an exhaust system configured to guide exhaust gases from the combustion chambers to the atmosphere, the exhaust system comprising a plurality of exhaust runners extending from the engine body and merging into a common passage, a secondary air injection system comprising a plurality of secondary air conduits configured to deliver secondary air separately to each individual exhaust runner, and at least one check valve in each secondary air conduit.

24. The engine according to claim 23, wherein the check valve comprises a reed valve.

25. The engine according to claim 23, wherein the check valves are disposed in close proximity to the exhaust runners.

26. The engine according to claim 23, additionally comprising an induction system configured to guide air into the combustion chambers, the secondary air injection system being separate from the induction system.

27. The engine according to claim 23, wherein the secondary air injection system further comprises and air inlet chamber, an air collecting chamber, and a conduit connecting the inlet chamber with the air collecting chamber.

28. The engine according to claim 27, wherein each of the secondary air conduits includes an upstream end connected to air collecting chamber.

29. The engine according to claim 28, wherein each of the check valves are disposed downstream from the air collecting chamber.

30. The engine according to claim 23 additionally comprising an induction system configured to guide air into the combustion chambers, an air pump configured to draw air from the induction system and inject the air into the exhaust system downstream from the exhaust runners.

31. The engine according to claim 30, wherein the induction system comprises at least one air intake chamber having a water repellent filter member, the air pump being configured to draw air from the air intake chamber on a downstream side of the water repellent filter member.

32. The engine according to claim 30, wherein the air pump is configured to deliver air to the exhaust system on an upstream side of an expansion chamber, the expansion chamber being further upstream than all other expansion chambers and the exhaust system.

33. The engine according to claim 30, wherein the air pump is configured to deliver air to the exhaust system at an upstream position of the common passage.

34. The engine according to claim 33, additionally comprising a cooling jacket disposed around at least a portion of the common passage downstream from the position to which the air pump delivers air to the exhaust system.

35. The engine according to claim 23, wherein the engine is configured to operate under a four-stroke principle.

36. An engine comprising an engine body defining at least one combustion chamber, an exhaust system defining an exhaust discharge path extending from the engine body to the atmosphere, a catalyst device disposed in the exhaust discharge path, a cooling jacket in thermal communication with at least a portion of the exhaust discharge path upstream from the catalyst device, a secondary air injection system configured to inject secondary air into the exhaust discharge path at a position upstream from the catalyst device, and air induction system configured to guide air to the combustion chamber, the secondary air injection system being configured to draw air from the induction system.

37. The engine according to claim 36, wherein the engine body defines a plurality of combustion chambers, the exhaust system including a plurality of exhaust runners, each exhaust runner communicating with one combustion chamber, the exhaust system further comprising a common exhaust discharge path receiving gases from all of the exhaust runners, the position at which the secondary air injection system injects air into the exhaust discharge path being in the common exhaust discharge path.

38. The engine according to claim 36, wherein a portion of the exhaust discharge path upstream from the catalyst device includes an expansion chamber, the position at which the secondary air injection system injects secondary air into the exhaust discharge path being at an upstream and of the expansion chamber.

39. The engine according to claim 38, wherein the expansion chamber includes a cooling jacket.

40. The engine according to claim 36, wherein the secondary air injection system includes and air pump, the air pump pressurizing the air injected into the exhaust discharge path.

41. The engine according to claim 36, wherein the induction system includes an air intake chamber having a water repellent filter member configured to filter air entering the intake chamber, the secondary air injection system being configured to draw the air from a downstream side of the water repellent filter member.

42. The engine according to claim 36, wherein the engine is configured to operate under a four-stroke principle.

43. The engine according to claim 36, wherein the engine is configured to operate under a two-stroke principle.

* * * * *

UNITED STATES PATENT AND TRADEMARK OFFICE
CERTIFICATE OF CORRECTION

PATENT NO. : 6,612,885 B2
DATED : September 2, 2003
INVENTOR(S) : Susumu Yamazaki et al.

It is certified that error appears in the above-identified patent and that said Letters Patent is hereby corrected as shown below:

Title page,
Item [75], Inventors, please change "Minco" to -- Mineo --.

Signed and Sealed this

Seventeenth Day of August, 2004

JON W. DUDAS
*Acting Director of the United States Patent and Trademark Office*